United States Patent Office 3,006,886
Patented Oct. 31, 1961

3,006,886
STABILIZED POLYOLEFIN COMPOSITIONS
William M. Schilling, West Chester, Pa., assignor to Hercules Powder Company, Wilmington, Del., a corporation of Delaware
No Drawing. Filed Aug. 24, 1959, Ser. No. 835,442
16 Claims. (Cl. 260—45.75)

This invention relates to polyolefin compositions and more particularly to the stabilization of stereoregular polymers of olefins containing four or more carbon atoms against degration by heat and light.

High molecular weight polymers of olefins containing four and more carbon atoms have recently been developed that show great promise in the plastics industry and the many other applications of thermoplastic materials. However, these hydrocarbon polymers, and particularly the stereoregular polymers when mechanically worked, as, for example, in extruding, molding, etc., processes are subject to considerable degradation at the high temperatures required for processing. Degradation also occurs on exposure of the finished article to heat and light as may be encountered in use as, for example, use in film, filaments, plastic sheeting, etc.

Now in accordance with this invention it has been found that stereoregular polymers of $\alpha$-olefins containing four or more carbon atoms may be stabilized against heat and light degradation by incorporating in the polymer composition a small amount of a bis-(p-alkylphenol) monosulfide wherein part or all of the phenolic hydrogen atoms have been replaced by nickel. The stabilization so obtained may be even further enhanced by the addition of a phenolic compound and more particularly by the addition of at least one of the group of polyalkyl-2(2'-hydroxyphenyl) - 2,4,4 - trimethylchromans, polyalkyl - 4(2' - hydroxyphenyl) - 2,2,4 - trimethylchromans and alkylidene-bis-(alkylphenol)s.

Any high molecular weight polymer of an olefin containing four or more carbon atoms may be stabilized in accordance with this invention by the addition of one of these nickel compounds of bis - (p - alkylphenol) monosulfides and particularly the stereoregular polymers, which are sometimes referred to as isotactic, may be so stabilized. Exemplary of these polymers are poly(butene-1), poly(pentene-1), poly(3-methylbutene-1), poly(4-methylpentene-1), polystyrene, etc. Copolymers of such olefins, as, for example, ethylene-butene copolymers, etc. may likewise be stabilized by the process of this invention. Solid, high molecular weight polymers that may be stabilized in accordance with this invention may be prepared by any of the well known methods for preparing solid, high molecular weight, stereoregular polymers, as, for example, by the processes taught in Belgian Patents 530,617; 538,782; 546,846; 548,964; 549,891; 549,909; 549,910; 555,890; 557,115; etc. The polymers will vary somewhat in their melting points, molecular weight, viscosity, etc., according to variations in the process of manufacture.

The bis-(p-alkylphenol) monosulfide nickel compounds which are used to stabilize the polymers of olefins having four or more carbon atoms in accordance with this invention are the full nickel phenolates where all of the phenolic hydrogens have been replaced with nickel or the so-called "phenol-phenolate" where some, but not all of the phenolic hydrogens have been replaced by nickel. The nickel phenol-phenolates may be prepared by a metathetic reaction between the sodium phenol-phenolate of a bis-(p-alkylphenol) monosulfide and a nickel halide in an anhydrous medium. These nickel phenol-phenolates are believed to have the following structure:

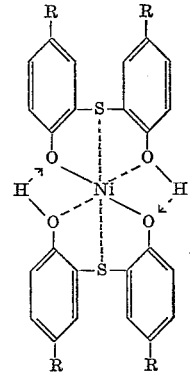

The nickel phenol-phenolates may also be prepared by the reaction of a hydrated nickel salt of a weak acid, e.g., hydrated nickel acetate, and a bis-(p-alkylphenol) monosulfide in which case the product is believed to have the following structure:

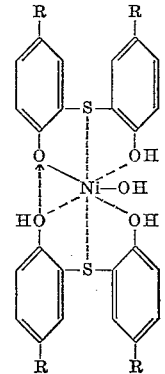

In the above formulae R is an alkyl group of from 2–12 carbon atoms. The dotted lines of the foregoing formulae represent interatomic linkages of the chelate type and simple hydrogen bonding in the case of the free phenolic group. The lines bearing arrows represent interchangeable linkages which suggest the equivalence of the two bis-(p-alkylphenol) monosulfide units in their relationship to the nickel atom.

The full nickel phenolates which may also be used are produced by similar reactions but with correspondingly increased amounts of reactants whereby products of the following general formula are produced.

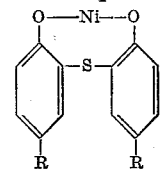

As pointed out above, the nickel compounds are derived from bis-(p-alkylphenol) monosulfides and preferably from o,o'-bis-(p-alkylphenol) monosulfides in which the alkyl group contains from 2–12 carbon atoms. Exemplary of these alkylphenol monosulfides are o,o'-bis-(p-tert-butylphenol) monosulfide, o,o'-bis-(p - tert - amylphenol) monosulfide, o,o'-bis-(p-2-ethylhexylphenol) monosulfide, o,o'bis - (p - octylphenol) monosulfide, i.e., o,o'-bis-(p-1,1,3,3-tetramethylbutylphenol) monosulfide, o,o'-bis-(p-nonylphenol) monosulfide, o,o' - bis - (p - laurylphenol) monosulfide.

The amount of the nickel compound incorporated in the polypropylene may be varied from a very small stabilizing amount up to several percent, but outstanding results have been obtained when from about 0.01% to about 5% and preferably from about 0.05% to about 1.0% based on the weight of polymer is used.

As pointed out above, the stabilizing effect of the above-described nickel compounds is even further enhanced by the addition of a phenolic compound, particularly outsanding results being obtained with 2(or 4)-(2'-hydroxyphenyl)chromans and bisphenols. The 2(or 4)-(2'-hydroxyphenyl)chromans that may be used are those which have one of the following general formulae:

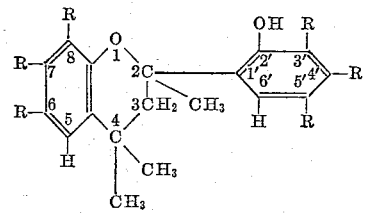

or

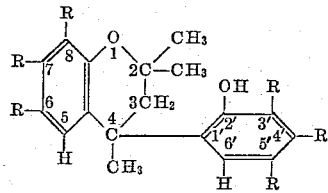

where each R may be hydrogen or alkyl, but at least one R in each of the aromatic rings is alkyl. These compounds may also be named as benzopyrans. Thus the 2-(2'-hydroxylphenyl)chromans may be named as 2,3-dihydro-2 (2'-hydroxyphenyl)-1,4-benzopyrans or 3,4-dihydro-2(2'-hydroxyphenyl)-1,2-benzopyrans and the 4-(2'-hydroxyphenyl)chromans may be named as 2,3-dihydro-4(2'-hydroxyphenyl)-1,4-benzopyrans or 3,4-dihydro-4(2'-hydroxyphenyl)-1,2-benzopyrans. The 2(2'-hydroxyphenyl)chromans are also sometimes named as flavans, i.e. 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or 4)-(2'-hydroxyphenyl)chromans that may be used in combination with the esters of thiodipropionic acid are 2(2'-hydroxyphenyl)-2,4,4,5',6-pentamethyl-chroman, 4(2'-hydroxyphenyl)2,2,4,5',6-pentamethylchroman, 2(2'-hydroxyphenyl)-5',6-diisopropyl-2,4,4-trimethylchroman, 2(2'-hydroxyphenyl)-5',6-diisopropyl-2,4,4,3',8-pentamethylchroman, 2(2'-hydroxyphenyl)-5',6-di-tert-butyl-2,4,4-trimethylchroman, 4(2'-hydroxyphenyl)-5',6-di-tert-butyl-2,2,4-trimethylchroman, 2(2'-hydroxyphenyl)-5',6-dioctyl-2,4,4-trimethylchroman, 2(2'-hydroxyphenyl)-5',6-dinonyl-2,4,4-trimethylchroman, 4 (2'-hydroxyphenyl)-5',6-dinonyl-2,2,4-trimethylchroman, 2(2'-hydroxyphenyl)-5',6-didecyl-2,4,4-trimethylchroman, etc.

The alkylidene-bis-(alkylphenol)s that may be used have one of the following general formulae:

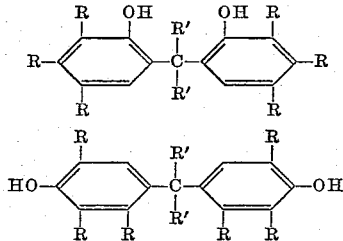

where each R may be hydrogen or alkyl, but at least one R in each of the aromatic rings is alkyl and the alkyl substitutent may be any alkyl radical as set forth above for the (2'-hydroxyphenyl)chroman structures and where each R' may be hydrogen or a lower alkyl as, for example, methyl or ethyl. Exemplary of these alkylidene-bis-(alkylphenol)s that may be used are 2,2'-methylene-bis-(5-isopropylphenol), 2,2'-methylene-bis-(4-methyl-6-isopropylphenol), 2,2'-methylene-bis-(4-methyl-6-tert-butylphenol), 2,2'-methylene-bis-(4-tert-butyl-6-methylphenol), 2,2'methylene-bis-(4,6-di-tert-butylphenol), 2,2'-methylene-bis-(4-nonylphenol), 2,2'-methylene-bis-(4-decylphenol), 4,4'-methylene-bis-(2,6-di-tert-butylphenol), 4,4'-methylene-bis(2-methyl-6-tert-butylphenol), 2,2'-ethylidene-bis-(4-methyl-6-tert-butylphenol), 2,2'-ethylidene-bis-(4,6-di-tert-butylphenol), 2,2'-ethylidene-bis-(4-octylphenol), 2,2'-ethylidene-bis-(4-nonylphenol), 2,2'-isopropylidene-bis-(4-methyl-6-isopropylphenol), 2,2'-isopropylidene-bis-(4-isopropylphenol), 2,2'-isopropylidene-bis-(4-isopropyl-6-methylphenol), 2,2'-isopropylidene-bis-(4-methyl-6-tert-butylphenol), 2,2'-isopropylidene-bis-(4-octylphenol), 2,2'-isopropylidene-bis-(4-nonylphenol), 2,2'-isopropylidene-bis-(4-decylphenol), 2,2'-isobutylidene-bis-(4-methyl-6-tert-butylphenol), 2,2'-isobutylidene-bis-(4-nonylphenol), etc.

These alkylidene-bis-(alkylphenol)s are prepared by any of the well-known procedures of the prior art. Usually, they are prepared by reacting an alkylphenol with formaldehyde, acetaldehyde, acetone, or methyl ethyl ketone, etc. in the presence of a strong acid such as hydrochloric acid, etc. In a similar fashion the 2-(2'-hydroxyphenyl)chromans are prepared by reacting an alkylphenol with acetone and the 4-(2'-hydroxyphenyl)chromans are prepared by reacting an alkylphenol with mesityl oxide. Thus, in many of these reactions a mixture of alkylidene-bis-(alkylphenol)s and (2'-hydroxyphenyl)chromans is obtained as, for example, when acetone is condensed or reacted with an alkylphenol the reaction product may be a 2-(2'-hydroxyphenyl)chroman or an isopropylidene-bis-(alkylphenol) depending on the reaction conditions or the reaction product may be a mixture of these two types of compounds. In such cases the individual compounds need not be isolated but instead the reaction product may be used with excellent results.

The amount of the chroman and/or bisphenol incorporated in the polyolefin may be varied from a very small stabilizing amount up to several percent, but outstanding results have been obtained when from about 0.01% to about 5% and preferably from about 0.05% to about 1.0% of the chroman or bisphenol based on the weight of polymer is used.

The stabilizers used in accordance with this invention may be admixed with the polyolefin by any of the usual procedures for incorporating an antioxidant in a solid material. A simple method is to dissolve the antioxidants in a low-boiling solvent such as acetone or hexane, etc., and, after thoroughly mixing the solution with the polymer in flake or other such form, evaporating the solvent or they may be incorporated by various means of mechanical mixing, or by dry mixing and extruding into molding powder, etc.

The stabilizing combination of this invention may be used in combination with other stabilizers such as ultraviolet light absorbers, antiacids such as calcium soaps, or other antioxidants. Other materials may also be incorporated in the polymer as, for example, pigments, dyes, fillers, etc.

The following examples will illustrate the tremendous stabilization that is obtained when polyolefins are stabilized in accordance with this invention. All parts and percentages are by weight unless otherwise indicated. By the term "Reduced Specific Viscosity" (RSV) used in the examples, is means the $\eta$ sp./c. determined on an 0.1% solution of the polymer in a given solvent at a given temperature. Where a melting point is given, it is the temperature at which birefringence due to crystallinity disappears.

EXAMPLES 1–3

In each of these examples the polyolefin was stabilized by incorporating therein 0.5% by weight of the polymer of the nickel phenol-phenolate of o,o'-bis-(p-1,1,3,3-tetramethylbutylphenol) monosulfide, designated as BOPS, and with 0.5% by weight of the nickel phenol-phenolate of o,o'-bis-(p-amylphenol) monosulfide, designated as BAPS and compared with a control sample of the polymer in which no stabilizer was added. In each case the stabilizer was mixed with the polymer by slurrying the polymer with a solution of the stabilizer in hexane, drying the sample, and then compression molding directly from the flake. The compression molding was carried out at 260° C., in Example 1, 166° C. in Example 2 and 90° C. in Example 3. The stabilized samples were compared to the unstabilized polymer by determining the RSV at given times as a measure of degradation after exposure in the Fade-Ometer. Visual observations such as crazing, if any were also made.

The nickel phenol-phenolate of o,o'-bis(p-1,1,3,3-tetramethylbutylphenol) monosulfide used in these examples was prepared by mixing a 1:1 solution of nickel acetate tetrahydrate in xylene with a 40% solution of o,o'-bis-(p-1,1,3,3-tetramethylbutylphenol) monosulfide in xylene in a molar ratio of 0.5:1 respectively, and heating the mixture at or slightly below the boiling point of acetic acid until the latter was essentially completely removed. The xylene solution was filtered to remove any insolubles that might be present and then was evaporated to remove the xylene. The residual liquor was cooled and the crystalline nickel phenol-phenolate of o,o'-bis-(p-1,1,3,3-tetramethylbutylphenol) monosulfide which separated was isolated. It was hard and friable and contained about 6.08% Ni (theoretical is 6.1% Ni).

The nickel phenol-phenolate of o,o'-bis-(p-tert-amylphenol) monosulfide used in these examples was prepared as follows: To a solution of sodium (0.46 g.) in anhydrous ethanol (50 g.) was added 3.58 g. of a bis-(p-tert-amylphenol) monosulfide having a melting point of 100–101° C. After solution was complete, a solution of nickel chloride hexahydrate (2.38 g.) in anhydrous ethanol (50 g.) was added. The reaction mixture was stirred 15 min., hexane (100 g.) was added, and the reaction mixture was then heated under reflux for 45 minutes. The sodium chloride that had formed was removed by filtration and washed with a small amount of benzene. The filtrate and benzene washings were combined and the diluents were removed by distillation. The residue was dissolved in hexane and the solution filtered, after which 95% ethanol was added to the filtrate and the hexane was removed by distillation. On cooling to room temperature the nickel phenol-phenolate of the o,o'-bis(p-tert-amylphenol) monosulfide crystallized in the form of green crystals. This crystalline product was separated and dried at 20° C. in vacuo for 16 hours. It did not melt below 360° C. The analytical results on this product were: theoritical, nickel 14.1%, carbon 63.6%, hydrogen 6.8%; found, nickel (by direct ash) 16.9%, carbon 57.45%, hydrogen 6.86%.

In Table I is set forth the RSV (measured in decahydronaphthalene at 135° C.) and melting point for each of the polymers before compounding and/or molding and the RSV of the sample after molding at 0, 48, 96 and 144 hours in the Fade-Ometer in comparison with a control where no stabilizer was added.

Table I

| Example | Polymer | Melting point, °C. | RSV | RSV after exposure in fade-ometer | | | |
|---|---|---|---|---|---|---|---|
| | | | | 0 hr. | 48 hr. | 96 hr. | 144 hr. |
| 1 | Poly(4-methyl-1-pentane)—Control | 243 | 5.0 | 2.1 | 0.9 | | |
| | (a) +0.5% Ni phenol-phenolate of BOPS | | | 1.9 | 1.8 | 2.0 | 1.6 |
| | (b) +0.5% Ni phenol-phenolate of BAPS | | | 2.2 | 2.2 | 2.8 | 3.0 |
| 2 | Poly(1-butene)—Control | 130 | 7.8 | 4.1 | ¹ 1.2 | 0.9 | |
| | (a) +0.5% Ni phenol-phenolate of BOPS | | | 9.1 | 2.4 | 2.1 | 0.15 |
| | (b) +0.5% Ni phenol-phenolate of BAPS | | | 8.1 | 3.1 | 2.6 | 0.19 |
| 3 | Poly(1-pentene)—Control | 79 | 1.9 | 2.5 | ¹ 0.4 | 0.2 | |
| | (a) +0.5% Ni phenol-phenolate of BOPS | | | 2.6 | 2.6 | 2.4 | 0.8 |
| | (b) +0.5% Ni phenol-phenolate of BAPS | | | 2.7 | 2.6 | 2.5 | ² 2.3 |

¹ Badly crazed.
² Sample was still good after 600 hours.

EXAMPLE 4

Samples of poly(3-methyl-1-butene), which polymer had a melting point of 310° C. and was insoluble in water and organic solvents, in flake form were admixed with 0.5% by weight of the nickel phenol-phenolate of o,o' - bis-(p-1,1,3,3-tetramethylbutylphenol) monosulfide (BOPS) and with 0.5% by weight of the nickel phenol-phenolate of o,o'-bis-(p-amylphenyl) monosulfide (BAPS) and exposed to a 275 watt mercury vapor sun lamp and the color change noted in comparison to unstabilized polymer flake. The time in hours at which slight yellowing of the white flake was noted and when there was definite yellowing observed was noted as follows:

| | Slight yellowing, hrs. | Definite yellowing, hrs. |
|---|---|---|
| Unstabilized | 7 | 11 |
| +0.5% Ni phenol-phenolate of BOPS | 10 | 24 |
| +0.5% Ni phenol-phenolate of BAPS | 15 | 24 |

EXAMPLE 5

Samples of a crystalline polystyrene having a melting point of 225° C. and an RSV of 2.4 (in toluene at 25° C.) were mixed with 0.5% by weight of the nickel phenol-phenolate of o,o'-bis(p-1,1,3,3-tetramethylbutylphenol) monosulfide and with 0.5% by weight of a nickel phenol-phenolate of o,o'-bis(p-amylphenol) monosulfide. The stabilized samples were compared to the unstabilized polymer by exposure in a Fade-Ometer and making visual observation as to yellowing and crazing of the samples. After 1000 hours of exposure in the Fade-Ometer the unstabilized polystyrene was very yellow and badly crazed, whereas the two stabilized samples were only slightly yellow and very slightly crazed.

EXAMPLE 6

This example demonstrates the greatly increased stabilization that is obtained when the above described nickel compounds are combined with a chroman or bisphenol.

The alkylphenol-acetone condensation product used in this example was prepared by condensing a technical nonylphenol with acetone by saturating the mixture with anhydrous hydrogen chloride at 60° C. and holding at that temperature for 70 hours. The technical nonylphenol used was a mixture of alkylphenols containing approximately 18% octyl-, 67% nonyl-, and 13% decyl with small amounts of other alkylphenols in which the alkyl radical contained more than 10 carbon atoms, the alkyl substituents being chiefly in the para-position and made up of straight- and branched-chain alkyl groups. The crude reaction mixture was distilled but the individual condensation products were not isolated. This distilled reaction product contained about 23% of the 2(2'-hydroxyphenyl)-2,4,4-trimethyl-5',6-dinonylchroman and about 34% of the 2,2'-isopropylidene-bis-(4-nonylphenol).

Samples of a poly(1-butene) having an RSV of 4.7 (decahydronaphthalene at 135° C.) were mixed, using the slurry technique and hexane as the solvent, with 0.5% by weight of the above nonylphenol-acetone condensation reaction product (NP–A–RP) alone and in combination with 0.5% by weight of the nickel phenol-phenolate of BOPS and with the nickel phenol-phenolate of BAPS. The stabilized samples and an unstabilized sample were compression molded directly from the flake at 166° C. for 15 minutes and then were exposed in the Fade-Ometer. The RSV of each of the samples was determined at periodic intervals and the results are tabulated below in Table II.

Table II

| Ex. | Polymer | RSV after exposure in fade-ometer | | | | |
|---|---|---|---|---|---|---|
| | | 0 hr. | 48 hr. | 96 hr. | 144 hr. | 288 hr. |
| 6 | Poly(1-butene): Unstabilized (control) | 4.0 | 1.2 | 0.8 | 0.7 | 0 |
| | +0.5% NP–A–RP | 4.7 | 3.9 | 2.0 | 1.2 | 0 |
| (a) | +0.5% NP–A–RP and 0.5% Ni phenol-phenolate of BOPS. | 4.7 | 4.7 | 4.6 | 4.4 | [1] 3.6 |
| (b) | +0.5% NP–A–RP and 0.5% Ni phenol-phenolate of BAPS. | 4.7 | 4.7 | 4.6 | 4.6 | [2] 4.4 |

[1] Sample became brittle after 332 hrs. exposure.
[2] Sample was still good after 500 hrs.

What I claim and desire to protect by Letters Patent is:

1. A stabilized polyolefin composition comprising a solid stereoregular polymer of an olefin selected from the group consisting of butene-1, 3-methylbutene-1, 4-methylpentene-1, and pentene-1 and in intimate admixture therewith a nickel phenolate of a bis(p-alkylphenol) monosulfide in which the alkyl group contains from 2 to 12 carbon atoms.

2. The composition of claim 1 wherein the amount of the nickel phenolate present is from about 0.01% to about 5% by weight of the polyolefin.

3. The composition of claim 2 wherein the nickel phenolate is a full nickel phenolate of a bis(p-alkylphenol) monosulfide.

4. The composition of claim 2 wherein the nickel phenolate is a nickel phenol-phenolate of a bis(p-alkylphenol) monosulfide.

5. The composition of claim 4 wherein the nickel phenolate is a nickel phenol-phenolate of bis(p-1,1,3,3-tetramethylbutylphenol) monosulfide.

6. The composition of claim 4 wherein the nickel phenolate is a nickel phenol-phenolate of bis(p-amylphenol) monosulfide.

7. A stabilized polyolefin composition comprising a solid stereoregular polymer of an olefin selected from the group consisting of butene-1, 3-methylbutene-1, 4-methylpentene-1, and pentene-1, and in intimate admixture therewith from about 0.01% to about 5% of a nickel phenolate of a bis-(p-alkylphenol) monosulfide in which the alkyl group contains from 2 to 12 carbon atoms in combination with at least one of the group consisting of 2(2'-hydroxyphenyl)-2,2,4-trimethyl-polyalkylchromans, 4(2'-hydroxyphenyl)-2,2,4-trimethyl-polyalkylchromans, and alkylidene-bis-(alkylphenol)s.

8. A stabilized polyolefin composition comprising a solid stereoregular polymer of an olefin selected from the group consisting of butene-1, 3-methylbutene-1, 4-methylpentene-1, and pentene-1, and in intimate admixture therewith from about 0.01% to about 5% of a full nickel phenolate of a bis-(p-alkylphenol) monosulfide in which the alkyl group contains from 2 to 12 carbon atoms in combination with from about 0.01% to about 5% of the reaction product of an alkylphenol and acetone.

9. A stabilized polyolefin composition comprising a solid stereoregular polymer of an olefin selected from the group consisting of butene-1, 3-methylbutene-1, 4-methylpentene-1, and pentene-1, and in intimate admixture therewith from about 0.01% to about 5% of a nickel phenol-phenolate of a bis-(p-alkylphenol) monosulfide in which the alkyl group contains from 2 to 12 carbon atoms in combination with from about 0.01% to about 5% of the reaction product of an alkylphenol and acetone.

10. A stabilized polyolefin composition comprising a solid stereoregular polymer of an olefin selected from the group consisting of butene-1, 3-methylbutene-1, 4-methylpentene-1, and pentene-1, and in intimate admixture therewith from about 0.01% to about 5% by the weight of the nickel phenol-phenolate of o,o'-bis(p-octylphenol) monosulfide in combination with the reaction product of nonylphenol and acetone.

11. A stabilized polyolefin composition comprising a solid stereoregular polymer of an olefin selected from the group consisting of butene-1, 3-methylbutene-1, 4-methylpentene-1, and pentene-1, and in intimate admixture therewith from about 0.01% to about 5% by the weight of the nickel phenol-phenolate of o,o'-bis-(p-amylphenol) monosulfide in combination with the reaction product of nonylphenol and acetone.

12. The composition of claim 10 wherein the polyolefin is poly(1-butene).

13. The composition of claim 11 wherein the polyolefin is poly(1-butene).

14. The composition of claim 10 wherein the polyolefin is poly(4-methyl-1-pentene).

15. The composition of claim 11 wherein the polyolefin is poly(4-methyl-1-pentene).

16. The composition of claim 11 wherein the polyolefin is poly(3-methyl-1-butene).

References Cited in the file of this patent

UNITED STATES PATENTS

| 2,340,938 | Daly | Feb. 8, 1944 |
| 2,380,299 | Evans et al. | July 10, 1945 |
| 2,917,550 | Dietzler | Dec. 15, 1959 |
| 2,971,940 | Fuchsman et al. | Feb. 14, 1961 |
| 2,971,941 | Fuchsman et al. | Feb. 14, 1961 |
| 2,971,968 | Nicholson et al. | Feb. 14, 1961 |